(12) United States Patent
Lee et al.

(10) Patent No.: US 11,071,130 B2
(45) Date of Patent: Jul. 20, 2021

(54) METHOD FOR SUPPORTING PLURALITY OF TRANSMISSION TIME INTERVALS, PLURALITY OF SUBCARRIER INTERVALS OR PLURALITY OF PROCESSING TIMES IN WIRELESS COMMUNICATION SYSTEM, AND DEVICE THEREFOR

(71) Applicant: LG Electronics Inc., Seoul (KR)

(72) Inventors: Hyunho Lee, Seoul (KR); Yunjung Yi, Seoul (KR); Daesung Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 3 days.

(21) Appl. No.: 16/483,336

(22) PCT Filed: Jan. 29, 2018

(86) PCT No.: PCT/KR2018/001217
§ 371 (c)(1),
(2) Date: Aug. 2, 2019

(87) PCT Pub. No.: WO2018/143621
PCT Pub. Date: Aug. 9, 2018

(65) Prior Publication Data
US 2020/0015256 A1    Jan. 9, 2020

Related U.S. Application Data

(60) Provisional application No. 62/454,870, filed on Feb. 5, 2017, provisional application No. 62/480,433, filed on Apr. 1, 2017.

(51) Int. Cl.
*H04W 72/12* (2009.01)
*H04L 5/00* (2006.01)
(Continued)

(52) U.S. Cl.
CPC ......... *H04W 72/1268* (2013.01); *H04L 5/001* (2013.01); *H04W 72/0446* (2013.01); *H04W 72/1289* (2013.01); *H04W 72/14* (2013.01)

(58) Field of Classification Search
CPC ................................................ H04W 72/1268
See application file for complete search history.

(56) References Cited

U.S. PATENT DOCUMENTS

2016/0360550 A1    12/2016 Chen et al.
2017/0373801 A1*   12/2017 Bergstrom ............ H04L 1/1628
(Continued)

OTHER PUBLICATIONS

Catt, "Explicit HARQ and scheduling timing design for LTE sTTI", 3GPP TSG RAN WG1 Meeting #87, Nov. 14-18, 2016, R1-1611360.
(Continued)

*Primary Examiner* — Kevin M Cunningham
(74) *Attorney, Agent, or Firm* — Dentons US LLP

(57) ABSTRACT

A method for transmitting an uplink signal for a terminal in a wireless communication system supporting aggregation between carriers configured with a plurality of transmission time intervals (TTI) or subcarrier intervals according to an embodiment of the present disclosure is carried out by the terminal and may comprise a step of receiving downlink data, or downlink control information including an uplink grant, and a step of transmitting an uplink signal corresponding to the downlink data or the uplink grant.

8 Claims, 10 Drawing Sheets

(51) Int. Cl.
*H04W 72/04* (2009.01)
*H04W 72/14* (2009.01)

(56) References Cited

U.S. PATENT DOCUMENTS

| | | | |
|---|---|---|---|
| 2018/0054284 A1* | 2/2018 | Froberg Olsson | H04L 5/0007 |
| 2018/0167172 A1* | 6/2018 | Hosseini | H04L 23/00 |
| 2019/0098622 A1* | 3/2019 | Lee | H04W 72/0446 |

OTHER PUBLICATIONS

Ericsson, "On reduced processing time for short TTI", 3GPP TSG-RAN WG1 #87, Nov. 14-18, 2016, R1-1611525.

Samsung, "Processing time reduction for sTTI operation", 3GPP TSG RAN WG1 Meeting #87, Nov. 14-18, 2016, R1-1612412.

NTT DoCoMo, Inc., "Views on processing time reduction and related procedures", 3GPP TSG RAN WG1 Meeting #87, Nov. 14-18, 2016, R1-1612698.

* cited by examiner

FIG. 7
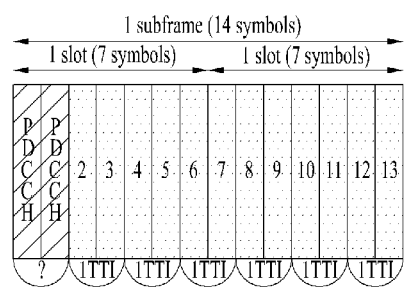
(a) 2-symbol TTI-DL structure
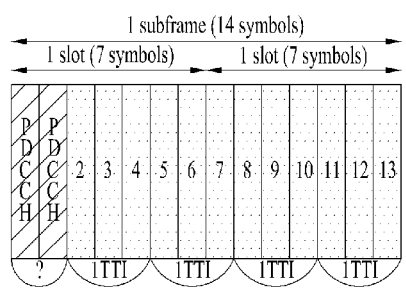
(b) 3-symbol TTI-DL structure
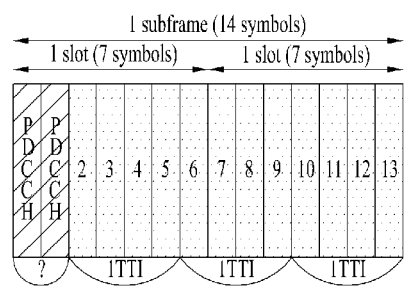
(c) 4-symbol TTI-DL structure
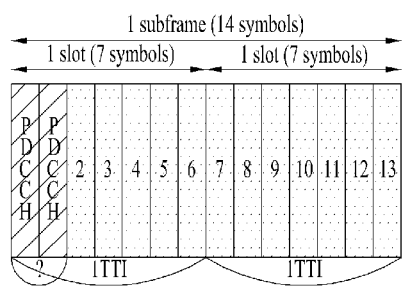
(d) 7-symbol TTI-DL structure

… (1)

METHOD FOR SUPPORTING PLURALITY OF TRANSMISSION TIME INTERVALS, PLURALITY OF SUBCARRIER INTERVALS OR PLURALITY OF PROCESSING TIMES IN WIRELESS COMMUNICATION SYSTEM, AND DEVICE THEREFOR

This application is a 35 USC § 371 National Stage entry of International Application No. PCT/KR2018/001217, filed on Jan. 29, 2018, which claims priority to U.S. Provisional Application No. 62/454,870, filed on Feb. 5, 2017, and U.S. Provisional Application No. 62/480,433, filed on Apr. 1, 2017, all of which are incorporated by reference in their entirety herein.

TECHNICAL FIELD

The present disclosure relates to a wireless communication system, and more particularly, to a method for supporting a plurality of transmission time intervals, a plurality of subcarrier intervals, or a plurality of processing times, and devices therefor.

BACKGROUND ART

The latency of packet data is one of important performance metrics. To reduce the latency of packet data and provide faster Internet access to an ender user is one of challenging issues in designing the next-generation mobile communication system called new radio access technology (RAT) as well as long term evolution (LTE).

The present disclosure provides a description related to a reference signal in a wireless communication system supporting a reduction in latency.

DISCLOSURE

Technical Problem

The present disclosure is directed to operation of uplink transmission or downlink reception of a terminal according to a difference between a plurality of processing times in carrier aggregation, the terminal supporting a plurality of transmission time interval (TTI) lengths, a plurality of subcarrier intervals, or a plurality of processing times in carrier aggregation.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In one aspect of the present disclosure, provided herein is a method for transmitting an uplink signal for a terminal in a wireless communication system supporting aggregation of carriers having a plurality of transmission time interval (TTI) lengths, a plurality of subcarrier spacings, or a plurality of processing times, the method being carried out by the terminal and including receiving downlink data or downlink control information, the downlink control information including an uplink grant, and transmitting an uplink signal corresponding to the downlink data or the uplink grant, wherein the uplink signal is transmitted when a processing time corresponding to a preset value passes after the downlink data or the downlink control information is received, wherein, when a channel on which the downlink data or the downlink control information is received is different from a channel on which the uplink signal is transmitted in terms of numerology or TTI length, the processing time has a time unit of the numerology or TTI length of at least one of the channel on which the downlink data or the downlink control information is received and the channel on which the uplink signal is transmitted.

Additionally or alternatively, the processing time may be represented by a combination of a time unit of the channel on which the downlink data or the downlink control information is received and a time unit of the channel on which the uplink signal is transmitted.

Additionally or alternatively, when the unit of the processing time is smaller than a time unit of the channel on which the uplink signal is transmitted, the uplink signal may be transmitted in a time unit of the channel for transmission of the uplink signal overlapping with a first processing time unit after the processing time, or transmitted in a next time unit following the time unit of the channel for transmission of the uplink signal overlapping with the first processing time unit.

Additionally or alternatively, when the unit of the processing time is larger than a time unit of the channel on which the uplink signal is transmitted, the uplink signal may be transmitted in one of time units of the channel for transmission of the uplink signal overlapping with a first processing time unit after the processing time, or a first one of time units of the channel for transmission of the unlike signal overlapping with a second processing time unit after the processing time.

Additionally or alternatively, the processing time may have a time length obtained by adding a preset value to a predetermined minimum processing time, or a time length obtained by subtracting the preset value from a predetermined maximum processing time.

Additionally or alternatively, the terminal is a part of an autonomous driving device and the terminal is communicating with at least one of a network or an autonomous driving vehicle.

In another aspect of the present disclosure, provided herein is a terminal for transmitting an uplink signal in a wireless communication system supporting aggregation of carriers having a plurality of transmission time interval (TTI) lengths, a plurality of subcarrier spacings, or a plurality of processing times, the terminal including a receiver and a transmitter, and a processor configured to control the receiver and the transmitter, wherein the processor is configured to receive downlink data or downlink control information, the downlink control information including an uplink grant, and transmit an uplink signal corresponding to the downlink data or the uplink grant, wherein the uplink signal is transmitted when a processing time corresponding to a preset value passes after the downlink data or the downlink control information is received, wherein, when a channel on which the downlink data or the downlink control information is received is different from a channel on which the uplink signal is transmitted in terms of numerology or TTI length, the processing time has a time unit of the numerology or TTI length of at least one of the channel on which the downlink data or the downlink control information is received and the channel on which the uplink signal is transmitted.

Additionally or alternatively, the processing time may be represented by a combination of a time unit of the channel on which the downlink data or the downlink control information is received and a time unit of the channel on which the uplink signal is transmitted.

Additionally or alternatively, when the unit of the processing time is smaller than a time unit of the channel on which the uplink signal is transmitted, the uplink signal may be transmitted in a time unit of the channel for transmission of the uplink signal overlapping with a first processing time unit after the processing time, or transmitted in a next time unit following the time unit of the channel for transmission of the uplink signal overlapping with the first processing time unit.

Additionally or alternatively, when the unit of the processing time is larger than a time unit of the channel on which the uplink signal is transmitted, the uplink signal may be transmitted in one of time units of the channel for transmission of the uplink signal overlapping with a first processing time unit after the processing time, or a first one of time units of the channel for transmission of the unlike signal overlapping with a second processing time unit after the processing time.

Additionally or alternatively, the processing time may have a time length obtained by adding a preset value to a predetermined minimum processing time, or a time length obtained by subtracting the preset value from a predetermined maximum processing time.

The above technical solutions are merely some parts of the embodiments of the present disclosure and various embodiments into which the technical features of the present disclosure are incorporated can be derived and understood by persons skilled in the art from the following detailed description of the present disclosure.

Advantageous Effects

According to embodiments of the present disclosure, aggregation of carriers having a plurality of TTI lengths, a plurality of subcarrier spacings, or a plurality of processing times may be efficiently performed.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

The accompanying drawings, which are included to provide a further understanding of the disclosure and are incorporated in and constitute a part of this specification, illustrate embodiments of the disclosure and together with the description serve to explain the principles of the disclosure.

FIG. 7 illustrates the structures of DL subframes including short TTIs of multiple lengths (various numbers of symbols);

MODE FOR INVENTION

Figure 1:
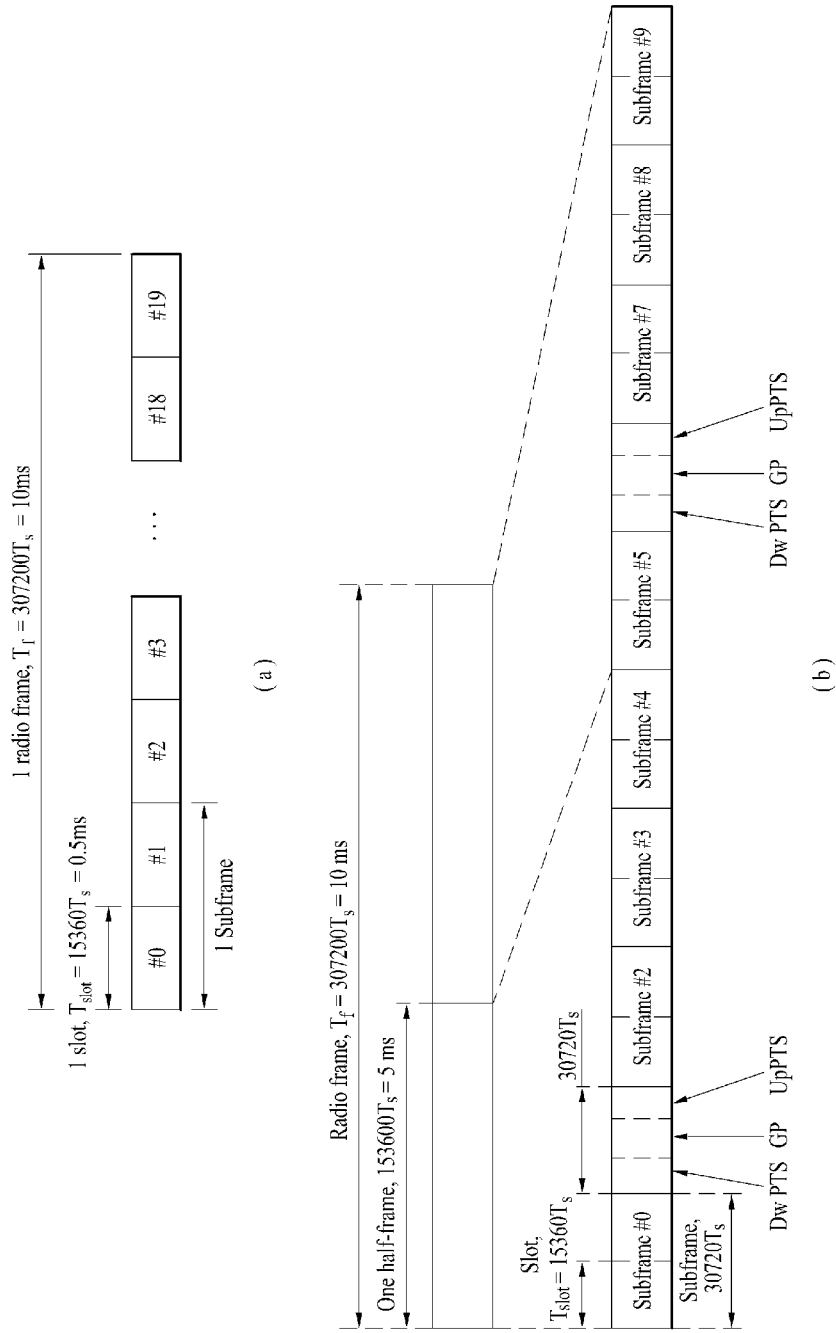
FIG. 1 is a diagram for an example of a radio frame structure used in wireless communication system.

Reference will now be made in detail to the preferred embodiments of the present disclosure, examples of which are illustrated in the accompanying drawings. The accompanying drawings illustrate exemplary embodiments of the present disclosure and provide a more detailed description of the present disclosure. However, the scope of the present disclosure should not be limited thereto.

In some cases, to prevent the concept of the present disclosure from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present disclosure, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present disclosure, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g. macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present disclosure, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present disclosure with respect to a method of performing coordinated data transmission using some or all nodes can be applied to various types of multi-node systems. For example, a node refers to an antenna group spaced apart from another node by a predetermined distance or more, in general. However, embodiments of the present disclosure, which will be described below, can even be applied to a case in which a node refers to an arbitrary antenna group irrespective of node interval. In the case of an eNB including an X-pole (cross polarized) antenna, for example, the embodiments of the preset disclosure are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present disclosure, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present disclosure, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowlegement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present disclosure, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

In Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

the frequency domain. An OFDM symbol may refer to a symbol period. A signal transmitted in each slot may be represented by a resource grid composed of $N_{RB}^{DL/UL} * N_{SC}^{RB}$ carriers and $N_{symb}^{DL/UL}$ OFDM symbols. Here $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{SC}^{RB}$ denotes the number of subcarriers constructing one RB.

Figure 2:
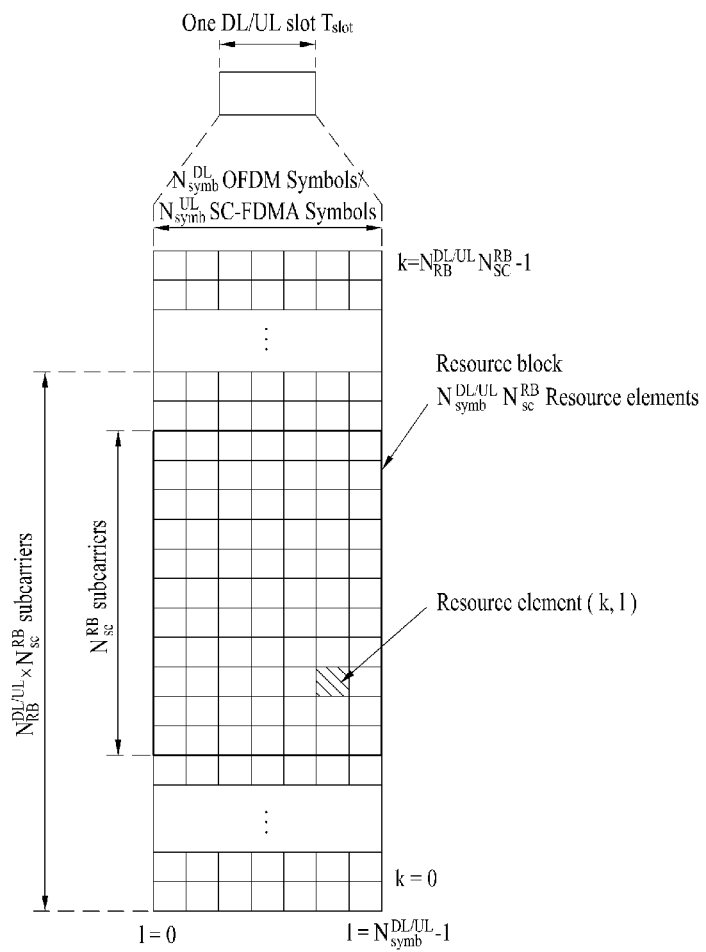
FIG. 2 is a diagram for an example of a downlink (DL)/uplink (UL) slot structure in a wireless communication system.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present disclosure can be equally applied to subframes having different numbers of OFDM symbols. Referring to FIG. 2, each OFDM symbol includes $N_{RB}^{DL/UL} * N_{SC}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g. 7) consecutive OFDM symbols in the time domain and $N_{SC}^{RB}$ (e.g. 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{SC}^{RB}$ REs. Each RE in a resource grid can be uniquely defined by an index pair (k, l) in a slot. Here, k is an index in the range

TABLE 2

| | | Normal cyclic prefix in downlink | | | Extended cyclic prefix in downlink | | |
|---|---|---|---|---|---|---|---|
| | | | UpPTS | | | UpPTS | |
| Special subframe configuration | DwPTS | | Normal cyclic prefix in uplink | Extended cyclic prefix in uplink | DwPTS | Normal cyclic prefix in uplink | Extended cyclic prefix in uplink |
| 0 | 6592 · $T_s$ | | 2192 · $T_s$ | 2560 · $T_s$ | 7680 · $T_s$ | 2192 · $T_s$ | 2560 · $T_s$ |
| 1 | 19760 · $T_s$ | | | | 20480 · $T_s$ | | |
| 2 | 21952 · $T_s$ | | | | 23040 · $T_s$ | | |
| 3 | 24144 · $T_s$ | | | | 25600 · $T_s$ | | |
| 4 | 26336 · $T_s$ | | | | 7680 · $T_s$ | 4384 · $T_s$ | 5120 · $T_s$ |
| 5 | 6592 · $T_s$ | | 4384 · $T_s$ | 5120 · $T_s$ | 20480 · $T_s$ | | |
| 6 | 19760 · $T_s$ | | | | 23040 · $T_s$ | | |
| 7 | 21952 · $T_s$ | | | | 12800 · $T_s$ | | |
| 8 | 24144 · $T_s$ | | | | — | — | — |
| 9 | 13168 · $T_s$ | | | | — | — | — |

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in of 0 to $N_{symb}^{DL/UL} * N_{SC}^{RB} - 1$ in the frequency domain and l is an index in the range of 0 to $N_{symb}^{DL/UL} - 1$.

Two RBs that occupy $N_{SC}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, $n_{VRB}=n_{VRB}$ is obtained. Numbers are given to the localized VRBs from 0 to $N_{VRB}^{DL}-1$, and $N_{VRB}^{DL}=N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
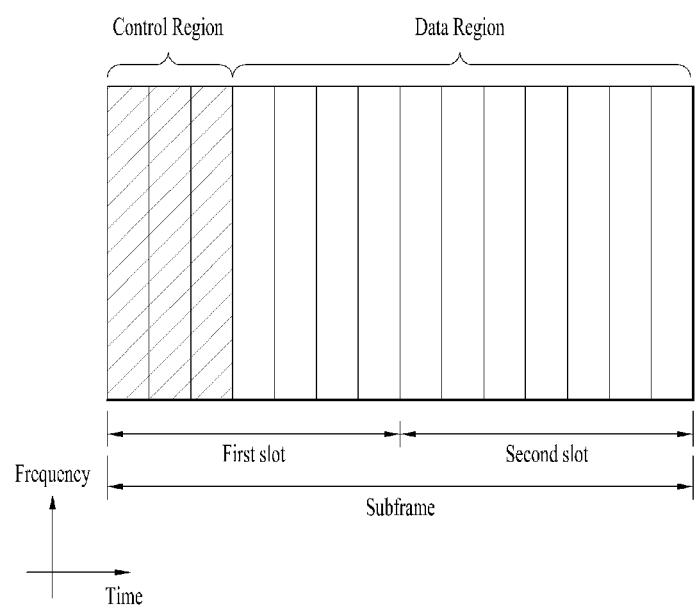
FIG. 3 is a diagram for an example of a downlink (DL) subframe structure used in 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| | Search Space | | |
|---|---|---|---|
| Type | Aggregation Level L | Size [in CCEs] | Number of PDCCH candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
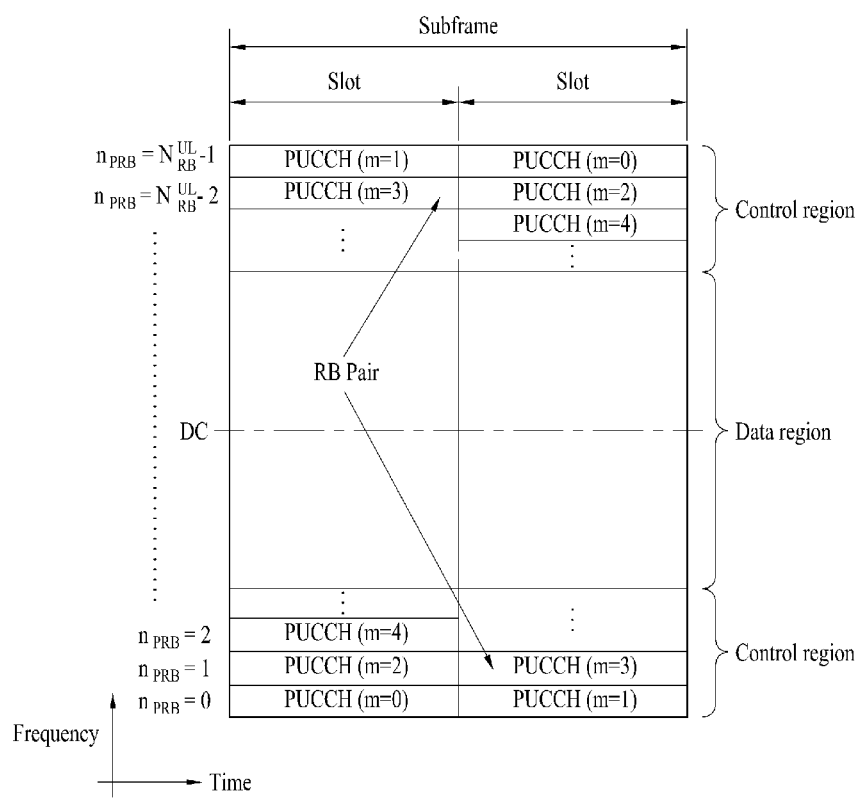
FIG. 4 is a diagram for an example of an uplink (UL) subframe structure used in 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

Figure 5:
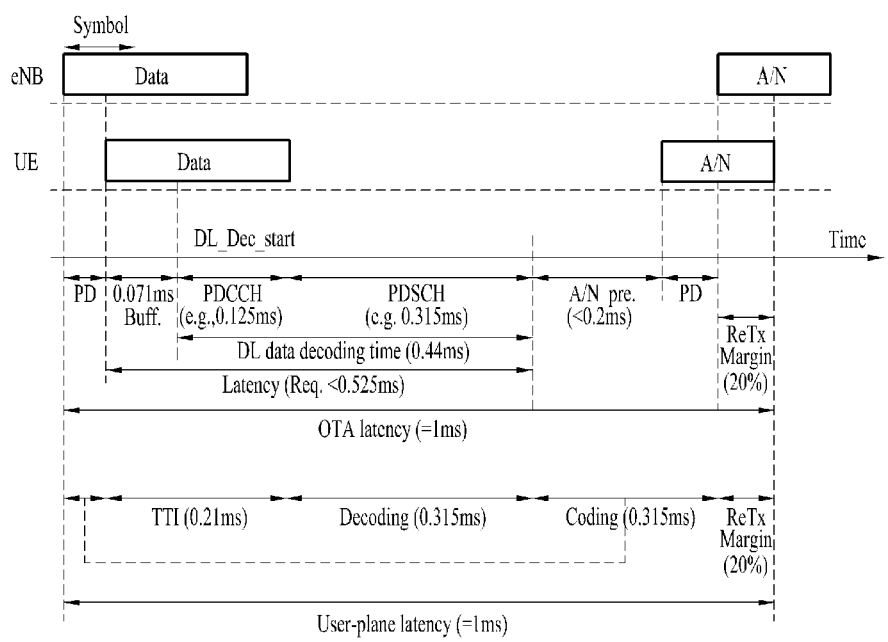
FIG. 5 illustrates a decrease in the length of a TTI according to reduction in user-plane latency.

To satisfy a reduction in the above-described latency, i.e., low latency, a TTI, which is a minimum unit for data transmission, needs to be newly designed to be reduced to a shortened TTI (sTTI) which is equal to or less than 0.5 msec (ms). For example, as illustrated in FIG. 5, in order to reduce user-plane (U-plane) latency to 1 ms until the UE completes transmission of ACK/NACK (A/N) since the eNB has started transmission of data (a PDCCH and a PDSCH), the sTTI may be configured in units of about 3 OFDM symbols.

Figure 6:
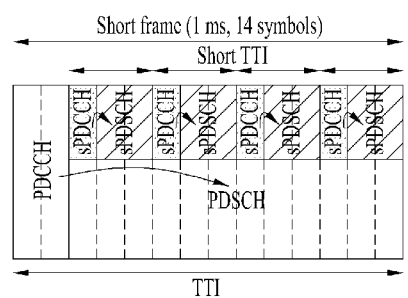
FIG. 6 illustrates an example of configuring a plurality of short TTIs in one subframe.

In a DL environment, a PDCCH for data transmission/scheduling within the sTTI (i.e., an sPDCCH) and a PDSCH for transmitting data within the sTTI (i.e., an sPDSCH) may be transmitted. For example, as illustrated in FIG. 6, a plurality of sTTIs may be configured using different OFDM symbols in one subframe. Characteristically, OFDM symbols in which legacy channels are transmitted may be excluded from OFDM symbols constituting an sTTI. The sPDCCH and the sPDSCH within the sTTI may be transmitted in different OFDM symbol regions by being time-division-multiplexed (TDMed) or may be transmitted in different PRBs or on different frequency resources by being frequency-division-multiplexed (FDMed).

In the present disclosure, a description is given based on an LTE/LTE-A system. In a legacy LTE/LTE-A system, a 1-ms subframe may include 14 OFDM symbols in the case of a normal CP. If the 1-ms subframe is configured by TTIs shorter than 1 ms, one subframe may include a plurality of TTIs. As in examples illustrated in FIG. 7, 2 symbols, 3 symbols, 4 symbols, or 7 symbols may constitute one TTI. Although not illustrated, the case in which one symbol constitutes one TTI may be considered. If one symbol constitutes one TTI unit, 12 TTIs are generated under the assumption that legacy PDCCHs are transmitted in two OFDM symbols. Similarly, as illustrated in (a) of FIG. 7, if two symbols constitute one TTI unit, 6 TTIs may be generated. As illustrated in (b) of FIG. 7, if 3 symbols constitute one TTI unit, 4 TTIs may be generated. As illustrated in (c) of FIG. 7, if 4 symbols constitute one TTI unit, 3 TTIs may be generated. In this case, it is assumed that legacy PDCCHs are transmitted in the first starting two OFDM symbols.

As illustrated in (d) of FIG. 7, in the case in which 7 symbols constitute one TTI, 7 symbols including legacy PDCCHs may constitute one TTI and 7 subsequent symbols may constitute one TTI. If one TTI includes 7 symbols, a UE supporting an sTTI assumes that, in a TTI located at a front part of one subframe (i.e., the first slot), front two OFDM symbols in which legacy PDCCHs are transmitted are punctured or rate-matched and that data of the UE and/or control information is transmitted in 5 symbols subsequent to the front two symbols. In contrast, the UE assumes that, in a TTI located at a rear part of one subframe (i.e., the second slot), data and/or control information may be transmitted in all of 7 symbols without a punctured or rate-matched resource region.

Figure 8:
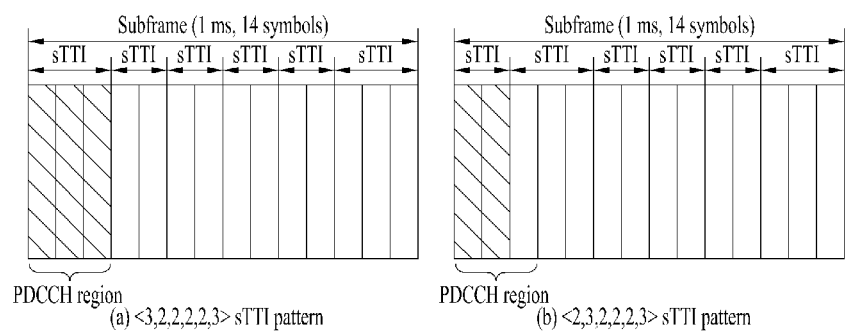
FIG. 8 illustrates the structures of DL subframes including short TTIs of 2 and 3 symbols.

The present disclosure considers an sTTI structure in which an sTTI including 2 OFDM symbols (hereinafter, OFDM symbols are referred to as "OSs") and an sTTI including 3 OSs are mixed in one subframe as illustrated in FIG. 8. In this way, an sTTI including 2 OSs or 3 OSs may be simply defined as 2-symbol sTTI (i.e., a 2-OS sTTI). In a <3,2,2,2,2,3> sTTI pattern illustrated in (a) of FIG. 8, an sPDCCH may be transmitted according to the number of symbols of a PDCCH. In a <2,3,2,2,2,3> sTTI pattern illustrated in (b) of FIG. 8, it may be difficult to transmit the sPDCCH due to a legacy PDCCH region.

Figure 9:
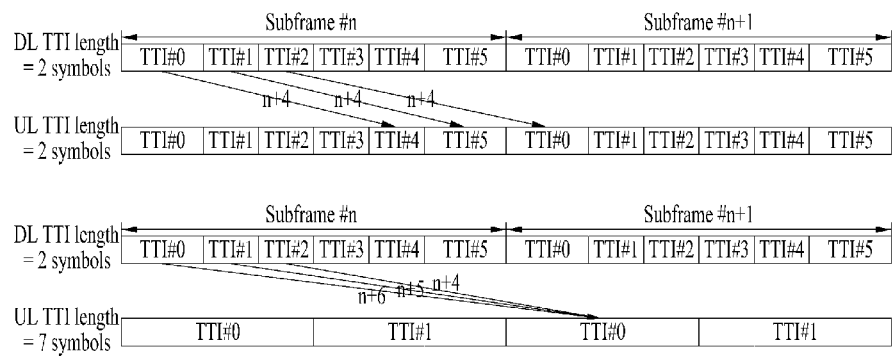
FIG. 9 illustrates HARQ-ACK transmission timing according to downlink signal reception in a wireless communication system having a plurality of TTI lengths.

Specifically, when an sTTI is configured for a UE, the TTI lengths for DL and UL may be configured to be different from each other. As an example, each of DL and UL may be configured with a 2-symbol TTI in order to reduce latency. However, for a UE that requires larger UCI or data transmission or has insufficient coverage, DL may be configured with a 2-symbol TTI and UL may be configured with a 7-symbol TTI, even if there is a loss in terms of latency. When the UL TTI is configured to be longer than the DL TTI as described above, an operation may be required in which HARQ-ACK for a plurality of DL data is transmitted on one UL control channel. FIG. 9 illustrates this operation.

The present disclosure proposes a method for UL control channel transmission when HARQ-ACK for a plurality of DL data is transmitted on one UL control channel as in the case of FIG. 9. Although the following proposals have exemplified an sTTI channel, they are generally applicable to UL channels having any TTI lengths.

HARQ-ACK Transmission Timing

In DL data channel scheduling, HARQ-ACK timing for the DL data channel may be indicated to the UE through a higher layer signal or a physical layer signal (e.g., DCI). At this time, the UL TTI length of the HARQ-ACK for the specific DL data channel and/or the index of a UL sTTI in which the HARQ-ACK is to be transmitted may be indicated to the UE through a higher layer signal or a physical layer signal (e.g., DCI). Alternatively, the layout of the UL sTTI may be indicated to the UE through the DCI.

In an example, the UL sTTI length/index of the HARQ-ACK for a specific DL data channel may be indicated by defining a separate DCI field, or indicated while being tied to an ACK/NACK Resource Indicator (ARI) field indicating one of a plurality of predefined PUCCH resources.

In another example, the UE may determine the UL sTTI index and timing at which the HARQ-ACK for a specific DL data channel is to be transmitted based on a processing time and a UL sTTI length configured through a higher layer or physical layer signal, and transmit a UL control channel.

Similarly, the UL TTI length for the UL data channel and/or the index of a UL sTTI in which the UL data channel is to be transmitted may be indicated by UL grant DCI.

Processing when UL Channels Overlap with Each Other

In the case where HARQ-ACK for a plurality of DL data is transmitted on one UL control channel, a rule may be defined such that, if the transmission timing of the UL control channel overlap with the transmission timing of other UL channels (e.g., PUSCH/PUCCH/SRS/sPUSCH), some UL channel(s) are dropped or stopped according to the priority. Specifically, even if the UL control channels have the same TTI length, the same format and the same payload size, different priorities may be defined/configured therefor according to the TTI length of the DL data channel corresponding to the HARQ-ACK.

As an example, the TTI length, format, payload size, and the like of the UL control channel for the HARQ-ACK transmission at {DL TTI length=2, UL TTI length=7} are the same those of the UL control channel for HARQ-ACK transmission at {DL TTI length=7, UL TTI length=7}, but a rule may be defined such that the UL control channel for the HARQ-ACK transmission at {DL TTI length=2, UL TTI length=7} has a higher priority and is transmitted without being dropped or interrupted when it overlaps with another channel. In detail, when the UL control channel for HARQ-ACK transmission at {DL TTI length=7, UL TTI length=7} overlaps with a 2-symbol sPUSCH, it may be dropped or stopped and the corresponding UCI may be piggybacked on the sPUSCH. On the other hand, a rule may be defined such that the UL control channel for HARQ-ACK transmission at {DL TTI length=2, UL TTI length=7} is transmitted and the 2-symbol sPUSCH is dropped or stopped. This rule may be applied only when there is no simultaneous transmission capability and/or configuration of multiple UL channels.

Consecutive A/N

When HARQ-ACK for a plurality of DL data is transmitted on one UL control channel, (s)PUCCH resources corresponding to a plurality of corresponding DL data channels may be configured to be different from each other. Specifically, the (s)PUCCH resource may be configured in association with a DL TTI (index). Alternatively, the (s)PUCCH resource may be implicitly or explicitly configured, but the (s)PUCCH resource for a plurality of DL data corresponding to the same UL TTI may be configured differently.

In this case, the (s)PUCCH resource used for UCI transmission may correspond to the last scheduled DL data in the UL TTI corresponding to the same UL TTI.

In UCI transmission, HARQ-ACK bundling may be configured through high-layer signaling or the like. In this case, the DL TTIs to be bundled may be the first to last scheduled DL TTIs among the DL TTIs corresponding to the same UL TTI. HARQ-ACK bundling (e.g., AND operation or multiplexing) may be performed on the selected single DL TTI or multiple DL TTIs. For example, when there is scheduling in the first and third DL TTIs among the four DL TTIs corresponding to the same UL TTI, the DL TTIs to be bundled may be the first, second, or third DL TTIs, and the (s)PUCCH resource may correspond to the third DL data.

Configurable Processing Time

In carrier aggregation (CA) consisting of cells having different TTI lengths and/or subcarrier spacings, a processing time (e.g., time taken until PDSCH-to-HARQ-ACK transmission, time taken until PDCCH-to-PDSCH transmission, time taken to until PDCCH-to-PUSCH transmission, etc.) may be predetermined to be a specific value or indicated through high layer signaling or DCI. The value may be among the candidate values designated considering the minimum processing time and the maximum allowed values. The value may be used in determining such candidate values, or may be used in interpreting each of determined candidate values. In a method, such candidate values may be determined based on a TTI, a slot, a minimum number of slots or symbols, or K symbols. A reference forming the basis of determination of each candidate value may be separately specified, determined based on a HARQ process number, dynamically signaled, or determined as a value according to a modulation and coding scheme/transport block size (MCS/TBS) or the like.

When the values are given in the corresponding scheme, if different numerologies for scheduling the PDCCH or the PDSCH are given, the numerology or the TTI length differs between the PDCCH and the PDSCH, or the numerology or the TTI length differs between the PDSCH and the PUCCH, the interpretations of the corresponding value by the network and the UE need to be consistent with each other. To this end, the following several methods are proposed. Here, the term "numerology" refers to determination of a TTI length, subcarrier spacing, and the like to be applied to the corresponding wireless competition system, or parameters such as a determined TTI length or a subcarrier interval, or a communication structure or system based thereon.

The actual processing time may be determined by interpreting the specific value on the basis of the DL or UL time unit (e.g., TTI length, symbol, multiple symbols, mini-slot, slot, etc.) of the scheduling cell. More specifically, the HARQ-ACK for the PDSCH or the HARQ-ACK for the PUSCH may be determined with a value of a scheduling unit, a slot duration or a mini-slot duration of the PDSCH or the PUSCH. In such an example, if the numerologies of the PDCCH and the PDSCH are different from each other, the HARQ-ACK may be determined based on the numerology of the PDSCH or a TTI-based slot or mini-slot. Specifically, the value of the PDCCH-to-PDSCH transmission may be based on the numerology of the PDCCH or the numerology of the PDSCH. In general, to facilitate multiplexing of control channels or data, the value may be determined based on a smaller subcarrier spacing between the two numerologies, and the reference numerology may be determined on the basis of the numerology for transmitting a synchronization signal, a PBCH or SIB, may be a value given for each carrier, may be given for each frequency range, or may be a value that is determined according to each frequency band.

Alternatively, when the minimum processing time is determined, only an offset to the value may be applied according to the corresponding method. For example, when the minimum processing time of PDSCH-to-HARQ-ACK transmission is k1*PDSCH TTI+k2*PUCCH TTI, the proposed schemes may be applied for additional offset K. The same approach is applicable even when the offset is applied to reduce the processing time with respect to the maximum processing time.

Also, these values may not be applied in one unit but may be applied in a combination of one or more units. In this case, the reference for the timing to be applied may differ among the values. For example, the transmission timing of PDCCH-to-PDSCH may be given by a combination of a slot and a symbol. The TTI of the PDCCH may be applied for the slot, and the TTI of the PDSCH may be applied for the symbol. Similarly, for PDSCH-to-PUCCH transmission timing, the TTI or numerology of the PDSCH may be applied for the slot, and the TTI or numerology of the PUCCH may be applied for the symbol.

As another method, the processing time may be predetermined as a specific value or indicated through a higher layer signal or DCI. The specific value may be interpreted based on a DL or UL time unit (e.g., TTI length, symbol, multiple symbols, mini-slot, slot, etc.) of the scheduled cell to determine the actual processing time.

As another method, the processing time may be predetermined as a specific value or indicated through a higher layer signal or DCI. The specific value may be interpreted based on a DL or UL time unit (e.g., TTI length, symbol, multiple symbols, mini-slot, slot, etc.) of a pre-designated cell (e.g., a Pcell or a carrier or cell on which PUCCH is carried) or a cell configured through a higher layer/physical layer signal to determine the actual processing time.

As another method, a rule may be defined such that the processing time is determined regardless of the numerology and the TTI in use by predetermining/predefining the reference timing (reference numerology and base unit—e.g., symbol, mini-slot, multiple symbols, slot, etc.).

In this case, if the time unit of the processing time differs from the time unit of a channel to be actually transmitted, the transmission time of the channel to be actually transmitted needs to be determined. As a specific example, if 6 TTIs are predetermined/predefined as the processing time in units of 2/3-symbol TTIs and a 7-symbol TTI is a time unit of a channel to be actually transmitted, a rule may be defined such that the channel is transmitted in a 7-symbol TTI overlapping with a corresponding 3-symbol TTI unit after the sixth TTI or in the next 7-symbol TTI after the 7-symbol TTI.

In another example, if 4 TTIs are predetermined/predefined as the processing time in units of 7-symbol TTIs and a time unit of a channel to be actually transmitted is a 2/3-symbol TTI, a rule may be defined such that the channel is transmitted in the first or last TTI or a TTI at a predetermined temporal position among the 2/3-symbol TTIs overlapping with the 7-symbol TTI or the first one of the 2/3-symbol TTIs overlapping with the next 7-symbol TTI after the 7-symbol TTI.

In the proposals above, the processing time may include DL allocation-to-DL HARQ timing, and/or DL data-to-DL HARQ transmission timing, and/or UL grant-to-UL data transmission timing. The above rules are generally applicable even in a non-CA situation in which DL and/or UL consists of one cell.

It is apparent that examples of the proposed scheme described above can also be included as one of the implementation methods of the present disclosure, and thus can be regarded as a kind of proposed schemes. Also, the proposed schemes described above may be implemented independently by combining (merging) some of the proposed schemes. A rule may be defined such that the BS delivers the information on whether the proposed methods are applicable (or information on the rules of the proposed methods) to the UE through a predefined signal (e.g., a physical layer signal or a higher layer signal).

Figure 10:
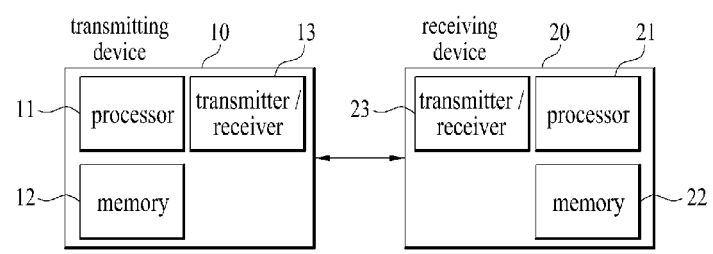
FIG. 10 is a block diagram for a device configured to implement embodiment(s) of the present disclosure.

FIG. 10 is a block diagram of a transmitting device 10 and a receiving device 20 configured to implement exemplary embodiments of the present disclosure. Referring to FIG. 6, the transmitting device 10 and the receiving device 20 respectively include transmitter/receiver 13 and 23 for transmitting and receiving radio signals carrying information, data, signals, and/or messages, memories 12 and 22 for storing information related to communication in a wireless communication system, and processors 11 and 21 connected operationally to the transmitter/receiver 13 and 23 and the memories 12 and 22 and configured to control the memories 12 and 22 and/or the transmitter/receiver 13 and 23 so as to perform at least one of the above-described embodiments of the present disclosure.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present disclosure. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present disclosure is implemented using firmware or software, firmware or software may be configured to include modules, procedures, functions, etc. performing the functions or operations of the present disclosure. Firmware or software configured to perform the present disclosure may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the transmitter/receiver 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the transmitter/receiver 13 may include an oscillator. The transmitter/receiver 13 may include Nt (where Nt is a positive integer) transmit antennas.

A signal processing process of the receiving device 20 is the reverse of the signal processing process of the transmitting device 10. Under the control of the processor 21, the transmitter/receiver 23 of the receiving device 10 receives RF signals transmitted by the transmitting device 10. The transmitter/receiver 23 may include Nr receive antennas and frequency down-converts each signal received through receive antennas into a baseband signal. The transmitter/receiver 23 may include an oscillator for frequency down-conversion. The processor 21 decodes and demodulates the radio signals received through the receive antennas and restores data that the transmitting device 10 wishes to transmit.

The transmitter/receiver 13 and 23 include one or more antennas. An antenna performs a function of transmitting signals processed by the transmitter/receiver 13 and 23 to the exterior or receiving radio signals from the exterior to transfer the radio signals to the transmitter/receiver 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. A transmitter/receiver supporting a MIMO function of transmitting and receiving data using a plurality of antennas may be connected to two or more antennas.

In embodiments of the present disclosure, a UE serves as the transmission device 10 on uplink and as the receiving device 20 on downlink. In embodiments of the present disclosure, an eNB serves as the receiving device 20 on uplink and as the transmission device 10 on downlink.

The transmitting device and/or the receiving device may be configured as a combination of one or more embodiments of the present disclosure.

As one of the embodiments, provided is a terminal for transmitting an uplink signal in a wireless communication system supporting aggregation of carriers having a length of a plurality of transmission time intervals (TTIs) or subcarrier spacings, the terminal including a receiver and a transmitter, and a processor configured to control the receiver and the transmitter. The processor may receive downlink data or downlink control information including an uplink grant, and transmit an uplink signal corresponding to the downlink data or the uplink grant. The uplink signal may be transmitted when a processing time corresponding to a preset value passes after the downlink data or the downlink control information is received, wherein, when a channel on which the downlink data or the downlink control information is received is different from a channel on which the uplink signal is transmitted in terms of numerology or TTI length, the processing time may have a time unit of the numerology or TTI length of at least one of the channel on which the downlink data or the downlink control information is received and the channel on which the uplink signal is transmitted.

Here, the processing time may be represented by a combination of a time unit of the channel on which the downlink data or the downlink control information is received and a time unit of the channel on which the uplink signal is transmitted.

In addition, when the unit of the processing time is smaller than a time unit of the channel on which the uplink signal is transmitted, the uplink signal may be transmitted in a time unit of the channel for transmission of the uplink signal overlapping with a first processing time unit after the processing time, or transmitted in a next time unit following the time unit of the channel for transmission of the uplink signal overlapping with the first processing time unit.

When the unit of the processing time is larger than a time unit of the channel on which the uplink signal is transmitted, the uplink signal may be transmitted in one of time units of the channel for transmission of the uplink signal overlapping with a first processing time unit after the processing time, or a first one of time units of the channel for transmission of the unlike signal overlapping with a second processing time unit after the processing time.

Further, the processing time may have a time length obtained by adding a preset value to a predetermined minimum processing time, or a time length obtained by subtracting the preset value from a predetermined maximum processing time.

The detailed description of the exemplary embodiments of the present disclosure has been given to enable those skilled in the art to implement and practice the disclosure. Although the disclosure has been described with reference to the exemplary embodiments, those skilled in the art will appreciate that various modifications and variations can be made in the present disclosure without departing from the spirit or scope of the disclosure described in the appended claims. For example, those skilled in the art may use each construction described in the above embodiments in combination with each other. Accordingly, the disclosure should not be limited to the specific embodiments described herein, but should be accorded the broadest scope consistent with the principles and novel features disclosed herein.

INDUSTRIAL APPLICABILITY

The present disclosure may be used for a wireless communication apparatus such as a user equipment (UE), a relay and an eNB.

The invention claimed is:

1. A method for transmitting Hybrid Automatic Repeat Request-Acknowledgment (HARQ-ACK) signal by a user equipment (UE) in a wireless communication system supporting a plurality of transmission time interval (TTI) lengths, the method comprising:
  receiving downlink data; and
  transmitting a HARQ-ACK signal related to the downlink data,
  wherein the HARQ-ACK signal is transmitted after a processing time from receiving the downlink data,
  wherein, based on a downlink TTI length for the downlink data and an uplink TTI length for the HARQ-ACK signal being different;
  the processing time is configured in units of at least one of the downlink TTI length and the uplink TTI length, and
  based on a first transmission timing of an uplink control channel for HARQ-ACK signal and a second transmission timing of a 2-symbol short Physical Uplink Shared Channel (sPUSCH) overlapping;
  based on the downlink TTI length being shorter than a predetermined length, the uplink control channel is transmitted and the 2-symbol sPUSCH is dropped, and
  based on the downlink TTI length being equal to or longer than the predetermined length, the uplink control channel is dropped, the 2-symbol sPUSCH is transmitted and uplink control information (UCI) for the uplink control channel is piggybacked to the 2-symbol sPUSCH.

2. The method of claim 1, wherein the processing time is a combination of the downlink TTI length and the uplink TTI length.

3. The method of claim 1, wherein, based on the unit of the processing time being smaller than a time unit of the uplink TTI length, the HARQ-ACK signal is transmitted in a next time unit following the time unit of the uplink TTI length overlapping with a first processing time unit.

4. The method of claim 1, wherein, based on the unit of the processing time being larger than a time unit of the uplink TTI length, the HARQ-ACK signal is transmitted in a first one of time units of the uplink TTI length overlapping with a second processing time unit after the processing time.

5. A user equipment (UE) for transmitting Hybrid Automatic Repeat Request-Acknowledgment (HARQ-ACK) signal in a wireless communication system supporting a plurality of transmission time interval (TTI) length, the UE comprising:
   a receiver and a transmitter; and
   a processor configured to control the receiver and the transmitter,
   wherein the processor is further configured to:
   receive downlink data; and
   transmit a HARQ-ACK signal related to the downlink data,
   wherein the HARQ-ACK signal is transmitted after a processing time from receiving the downlink data,
   wherein, based on a downlink TTI length for the downlink data and an uplink TTI length for the HARQ-ACK signal being different;
   the processing time is configured in units of at least one of the downlink TTI length and the uplink TTI length, and
   based on a first transmission timing of an uplink control channel for HARQ-ACK signal and a second transmission timing of a 2-symbol short Physical Uplink Shared Channel (sPUSCH) overlapping;
   based on the downlink TTI length being shorter than a predetermined length, the uplink control channel is transmitted and the 2-symbol sPUSCH is dropped, and
   based on the downlink TTI length being equal to or longer than the predetermined length, the uplink control channel is dropped, the 2-symbol sPUSCH is transmitted and uplink control information (UCI) for the uplink control channel is piggybacked to the 2-symbol sPUSCH.

6. The UE of claim 5, wherein the processing time is a combination of the downlink TTI length and the uplink TTI length.

7. The UE of claim 5, wherein, based on the unit of the processing time being smaller than a time unit of the uplink TTI length, the HARQ-ACK signal is transmitted in a next time unit following the time unit of the uplink TTI length overlapping with a first processing time unit.

8. The UE of claim 5, wherein, based on the unit of the processing time being larger than a time unit of the uplink TTI length, the HARQ-ACK signal is transmitted in a first one of time units of the uplink TTI length overlapping with a second processing time unit after the processing time.

* * * * *